UNITED STATES PATENT OFFICE.

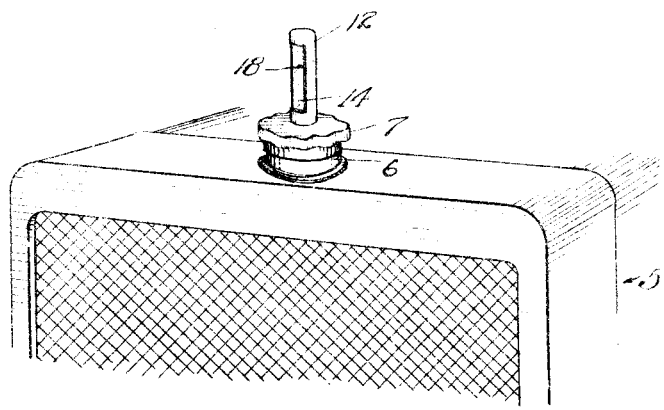
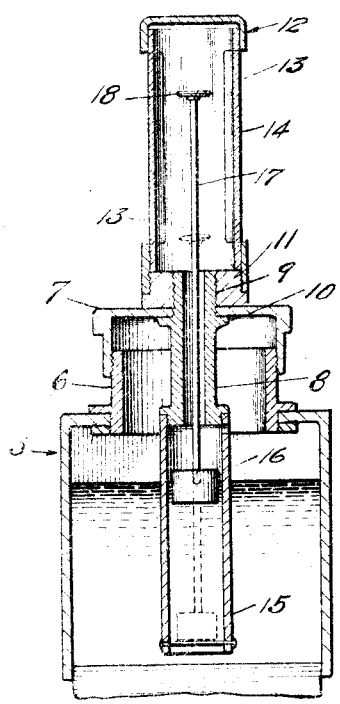
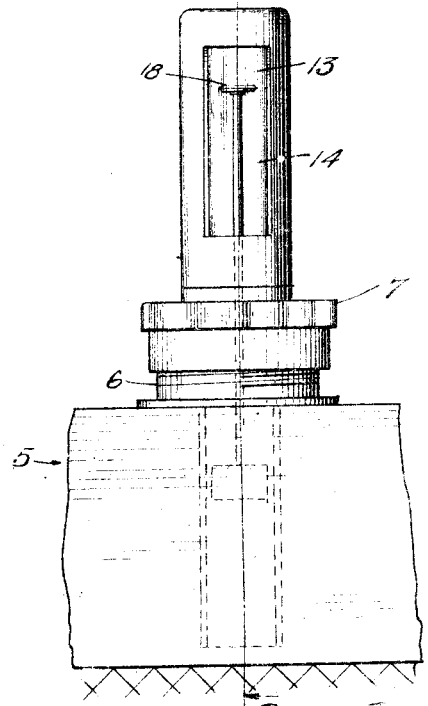

FREDERICK H. OBERMANN, OF REDLANDS, CALIFORNIA.

GAGE.

1,173,117. Specification of Letters Patent. Patented Feb. 22, 1916.

Application filed January 4, 1915. Serial No. 336.

*To all whom it may concern:*

Be it known that I, FREDERICK H. OBERMANN, a citizen of the United States, residing at Redlands, in the county of San Bernardino, State of California, have invented new and useful Improvements in Gages, of which the following is a specification.

This invention relates to a gage.

It is the object of this invention to provide a gage which is particularly applicable for use in indicating the water level in automobile radiators.

A further object is to provide a gage of the above character which is so constructed that it may be applied to the radiator closure cap, and by means of which the driver of the automobile can readily determine the water level within the radiator without removing the cap.

The invention is illustrated in the accompanying drawings, in which:

Figure 1 is a perspective view of the upper portion of an automobile radiator, illustrating the invention as applied. Fig. 2 is a view of the gage in vertical section, partly in elevation, as seen on the line 2—2 of Fig. 3. Fig. 3 is a view of the gage in front elevation.

More specifically, 5 indicates an automobile radiator which is provided with the usual threaded nipple 6, on its upper end wall, through which water is introduced when it is desired to fill the radiator and its connections. The nipple 6 is closed by the usual threaded cap 7.

In carrying out the present invention the tube 8, having a threaded upper end 9 and formed with a flange 10 at the base of the threaded portion 9 is mounted on the cap 7, with the portion 9 extending through an opening in the cap 7, and the flange 10 abutting against the lower side of the cap. The tube 8 is held in place on the cap 7 by means of a nut 11, screwed on the threaded portion 9 of the tube 8, to bear against the upper face of the cap 7 and bind the flange 10 against the under side of the cap. The nut 11 is formed with an exteriorly-threaded portion to receive a metallic cylindrical jacket 12, formed with longitudinally extending openings 13, and containing a glass tube 14, tightly incased by the jacket 12. The tube 8 extends downwardly into the nipple 6 and is threaded at its lower end to receive a cylindrical guide 15, adapted to extend below the surface of the water in the radiator 5.

Mounted in the guide casing 15 is a float 16, to which is secured an upwardly extending stem 17, which projects through the tube 8 and terminates in a head 18, arranged in the tube 14. The head 18 and the float 16 are mounted on the opposite ends of stem 17 so that when the water level in the radiator 5 falls below normal, the float 16 will move downwardly in its guide casing 15 sufficiently far to dispose the head 18 adjacent the lower end of the opening 13 in the jacket 12, as indicated in dotted lines in Fig. 2.

In the operation of the invention, the radiator is filled with water to the desired level through the nipple 6 in the usual manner; the cap 7, with the gage attached thereto being removed for this purpose. The cap 7 is then replaced, thus positioning the guide-casing 15 with its lower end submerged in the water within the radiator 5. The float 16 will be carried on the surface of the water and the head 18 and the stem 17 will be positioned accordingly in the tube 14 and will be visible through the opening 13 in the jacket 12. As the water level in the radiator 5 falls, the float 16 and the head 18, carried by the stem 17, will be lowered accordingly.

By the use of this invention the level of the water in the radiator 5 can be readily determined without necessitating the removal of the cap 7.

What I claim is:—

The combination with a radiator closure cap provided with an aperture, of a float indicating mechanism attached to said cap, comprising a tubular member provided with a threaded end disposed in said aperture and a shoulder abutting the underside of said cap, said tubular member extending downwardly from said cap, and a slidable rod mounted in said tubular member having a headed stem attached thereto extending upwardly through said tubular member and a buoyant member secured to the lower end thereof, and an indicating gage glass attached to the upper threaded end of said tubular member, the lower end of said tubular member being open and having a stop means thereon to limit the downward movement of said buoyant member.

In witness that I claim the foregoing I have hereunto subscribed my name this 16th day of December, 1914.

FREDERICK H. OBERMANN.

Witnesses:
AUSTIN E. PARK,
W. FRANK STUTT.